United States Patent
Schofield et al.

(10) Patent No.: US 7,064,310 B2
(45) Date of Patent: Jun. 20, 2006

(54) LIGHT-RESPONSIVE VEHICLE CONTROL SUCH AS AN ELECTRO-OPTIC REARVIEW MIRROR SYSTEM THAT IS ADAPTIVE TO VEHICLE CONFIGURATION HAVING A SENSITIVITY SELECTION

(75) Inventors: Kenneth Schofield, Holland, MI (US); Kenneth L Schierbeek, Zeeland, MI (US)

(73) Assignee: Donnelly Corporation, Holland, MI (US)

( * ) Notice: Subject to any disclaimer, the term of this patent is extended or adjusted under 35 U.S.C. 154(b) by 436 days.

(21) Appl. No.: 10/614,234

(22) Filed: Jul. 7, 2003

(65) Prior Publication Data

US 2004/0094692 A1    May 20, 2004

Related U.S. Application Data

(63) Continuation of application No. 10/095,136, filed on Mar. 11, 2002, now Pat. No. 6,590,193, which is a continuation of application No. 09/415,346, filed on Oct. 8, 1999, now Pat. No. 6,355,920.

(60) Provisional application No. 60/117,633, filed on Jan. 28, 1999, provisional application No. 60/103,721, filed on Oct. 9, 1998.

(51) Int. Cl.
*G01J 1/32* (2006.01)

(52) U.S. Cl. .................................. 250/205; 250/214 AL

(58) Field of Classification Search ...................... None
See application file for complete search history.

(56) References Cited

U.S. PATENT DOCUMENTS

| | | | |
|---|---|---|---|
| 4,793,690 A * | 12/1988 | Gahan et al. ................ | 359/604 |
| 4,886,960 A | 12/1989 | Molyneux et al. | |
| 4,896,030 A | 1/1990 | Miyaji | |
| 5,451,822 A | 9/1995 | Bechtel et al. | |
| 5,715,093 A | 2/1998 | Schierbeek et al. | |
| 5,812,321 A | 9/1998 | Schierbeek et al. | |
| 6,056,410 A | 5/2000 | Hoekstra et al. | |
| 6,089,721 A | 7/2000 | Schierbeek | |
| 6,210,008 B1 | 4/2001 | Hoekstra et al. | |
| 6,299,315 B1 | 10/2001 | Hoekstra et al. | |
| 6,305,807 B1 | 10/2001 | Schierbeek | |
| 6,355,920 B1 | 3/2002 | Schofield et al. | |
| 6,406,152 B1 | 6/2002 | Hoekstra et al. | |
| 6,474,820 B1 | 11/2002 | Hoekstra et al. | |
| 6,547,404 B1 | 4/2003 | Schierbeek | |
| 6,590,193 B1 | 7/2003 | Schofield et al. | |

OTHER PUBLICATIONS

Commonly assigned co-pending U.S. Appl. No. 10/285,008, filed on Oct. 31, 2002, entitled Digital Electrochromic Mirror System (P-1048).

Commonly assigned co-pending U.S. Appl. No. 10/413,264, filed on Apr. 14, 2003, entitled Digital Electrochromic Mirror System (P-1088).

* cited by examiner

*Primary Examiner*—Que T. Le
(74) *Attorney, Agent, or Firm*—Van Dyke, Gardner, Linn & Burkhart, LLP

(57) ABSTRACT

A vehicular rearview mirror system includes a control that receives inputs from ambient and glare detecting light sensors and establishes reflectance levels of the interior mirror reflective element and exterior mirror reflective element. The control includes a sensitivity selection for establishing a sensitivity level as a function of light sensed by at least one of the ambient and glare detecting light sensors. The reflectance level of the interior and/or exterior mirror reflective element is at least a function of the sensitivity level.

37 Claims, 5 Drawing Sheets

LIGHT-RESPONSIVE VEHICLE CONTROL SUCH AS AN ELECTRO-OPTIC REARVIEW MIRROR SYSTEM THAT IS ADAPTIVE TO VEHICLE CONFIGURATION HAVING A SENSITIVITY SELECTION

CROSS-REFERENCE TO RELATED APPLICATIONS

This application is a continuation of prior U.S. patent application Ser. No. 10/095,136, filed on Mar. 11, 2002, now U.S. Pat. No. 6,590,193, which is a continuation of U.S. patent application Ser. No. 09/415,346, filed on Oct. 8, 1999, now U.S. Pat. No. 6,355,920, which claims priority from U.S. provisional patent application Ser. No. 60/103,721, filed on Oct. 9, 1998, and U.S. provisional patent application Ser. No. 60/117,633, filed on Jan. 28, 1999, by Kenneth Schofield and Kenneth L. Schierbeek.

BACKGROUND OF THE INVENTION

This invention relates generally to a vehicle control and, in particular, a light-responsive vehicle control which produces an output to operate a device as a function of light sensed by a light sensor. More particularly, the present invention relates to a control that can be used to establish the partial reflectance level of an electro-optic rearview mirror, although the invention is also applicable to a headlight activation control for activating a vehicle's headlights at low light conditions and deactivating the vehicle's headlights at high light conditions.

Light-responsive vehicle controls may include one or more light sensors which sense light conditions from within the vehicle passenger compartment. At least one of the light sensors may be directed in a particular direction, such as rearward of the vehicle. The control receives an input from the light sensor, or sensors, and produces an output to operate a device as a function of the light sensed and an operating parameter, such as a sensitivity value. The sensitivity value may be manually set, as by a user operator control, or may be set internally in the control either at a fixed level or at a variable level established by the control. In addition to light sensors directed rearward of the vehicle, light sensors may be directed upwardly or in other directions within the passenger compartment.

In a conventional electro-optic mirror control system, such as an electrochromic mirror system, a control may be responsive to more than one light sensor. For example, a control may respond to two light sensors, such as a generally forward-facing light sensor and a generally rearward-facing light sensor. The rearward-facing light sensor is more sensitive to glare, reflected by the rearview mirror into the driver's eyes, produced from light sources rearward of the vehicle. One such control is disclosed in commonly assigned U.S. Pat. No. 5,715,093 entitled AUTOMATIC REARVIEW MIRROR SYSTEM WITH AUTOMATIC HEADLIGHT ACTIVATION issued to Kenneth L. Schierbeek and Niall R. Lynam, the disclosure of which is hereby incorporated herein by reference. Such control includes a pair of light sensors, one directed generally forward of the vehicle and one directed generally rearwardly of the vehicle. The control responds to the light levels to which the light sensors are exposed in order to produce a drive signal to establish a partial reflectance level for an electro-optic mirror element and in order to produce a headlight activation signal in order to switch the vehicle headlights between an activated and a deactivated condition. In this manner, both the condition of the vehicle headlights, as well as the partial reflectance level of the electro-optic mirror, are established as a function of the light levels to which the light sensors are exposed.

It is common for vehicles to be supplied in various configurations. The vehicle is configured in this manner by some form of specification document following the vehicle through the assembly process in order to provide information for the various alternative components to be placed on the vehicle. Each alternative component is identified by a unique stock-keeping unit or SKU. Even minor differences in the characteristics of a particular component require a separate SKU so that the SKU defines a unique component. The more unique components which the manufacturer must contend with increases the manufacturing cost for the vehicle because it increases inventory expenses as well as overall record keeping expenses. Therefore, it would be desirable to reduce the number of unique components, each identified by an SKU, which must be made available for assembling a vehicle. This should not, however, limit the options available to the consumer because the availability of options is a desirable sales feature.

One optional feature which may be provided on a vehicle is tinted glazing. Tinted glazing is often optionally supplied for the rear window, facing rearwardly of the vehicle. It may also be supplied for the side windows in the rear portion of the passenger compartment. Because of safety concerns, the forward-facing window, or windshield, as well as the side windows used by the driver are not supplied with tinted glazing. Tinted glazing decreases light transitivity through the window. Therefore, glare-producing light which penetrates the rear window is attenuated by the tint which reduces the amount of light received by the rearward-facing light sensor of the electro-optic rearview mirror system. Because the partial reflectance level control responds to a ratio between the light received by the forward-facing light sensor and the rearward-facing light sensor, the presence of a tinted rear window affects the partial reflectance level established by the control. It turns out that, in the case of the interior rearview mirror, the system is self-compensating. This is because the glare viewed by the driver is also attenuated by the tint of the rear window so that the alteration of the partial reflectivity level established by the control is cancelled out by the tinted window such that the glare in the driver's eyes is the same as it would be without the tinted window.

However, certain applications do not cancel out the effect of the tinted rear window and, therefore, require different configurations for vehicles with and for vehicles without tinted rear windows. For example, the exterior rearview mirrors are viewed through the non-tinted side windows on either side of the driver. With the light sensors positioned within the passenger compartment, the response of the exterior mirror will differ dependent upon whether or not the vehicle has a tinted rear window. However, there is not a corresponding offset in glare level which would cancel out the effect on the reflectivity level caused by the tinted rear window. The result is that performance of the exterior rearview mirrors in a vehicle having a tinted rear window will be different from the performance in a vehicle having a non-tinted rear window.

The performance difference of the electro-optic rearview mirror system in a vehicle having a tinted rear window versus the performance of a vehicle having a non-tinted rear window may be accommodated by providing two or more SKUs for the electro-optic mirror system. One SKU is for use with a vehicle having a tinted rearview mirror. The other SKU is for use with a vehicle having a non-tinted rearview mirror.

Another approach has been to treat all vehicles manufactured as if they have a tinted rear window. A mirror system control is provided that chooses a different reflectivity value for the interior mirror and the exterior mirrors during transitions in reflectivity values. Transitions in reflectivity values occur such as when a glare source first becomes present, becomes stronger, or disappears. Such an approach has several difficulties. The first difficulty is that not all vehicles are ordered with tinted rear windows. These vehicles will receive a mirror system that is not optimal for that vehicle. The second drawback is that, even in vehicles equipped with tinted rear windows, the compensation occurs only during periods of transition between different mirror reflectance values. Most of the time, the mirror reflectivity values are stationary. During such periods of stationary reflectivity values, no compensation is provided for the effect of tinted rear windows.

Other light-responsive vehicle controls are also subject to affect from the vehicle configuration. For example, an automatic headlight activation circuit of the type disclosed in U.S. Pat. No. 5,715,093. The automatic headlight activation circuit in the '093 patent responds to light levels sensed from light sensors directed, respectively, forwardly and rearwardly with respect to the vehicle such that the rearward-directed light sensor senses light through the rear window. The headlights are actuated in response to light sensed by both of the two light sensors. With such headlight activation circuit, the light sensed by the rearward-facing light sensor will be affected by attenuation caused by tinted windows and, therefore, will be dependent upon the vehicle configuration.

SUMMARY OF THE INVENTION

The present invention provides an adaptive light-responsive vehicle control, such as an electro-optic rearview mirror system, and a method of adapting a light-responsive vehicle control to a vehicle which accommodates variations in vehicle configuration.

An adaptive light-responsive vehicle control according to an aspect of the invention is useful with a vehicle having a passenger compartment including a forward-facing, forward window, such as a windshield, and a rearward-facing rear window. At least one light sensor is provided that is directed toward one of the vehicle windows to receive light passing through the vehicle window. A control receives an input from the light sensor and produces an output to operate a device. The output is a function of light sensed by the light sensor and an operating parameter. According to this aspect of the invention, the control is responsive to light transmissivity of the at least one vehicle window to establish a value of the operating parameter. By way of example, the operating parameter may be a sensitivity value of the control.

A method of adapting an electro-optic rearview mirror system to a vehicle according to another aspect of the invention is useful with a vehicle having a windshield providing a field of view forward of the vehicle and a rear window providing a field of view rearward of the vehicle, wherein the rear window having an unknown level of transmissivity includes the following. At least a first light sensor is provided to receive light passing through the vehicle rear window. At least one second light sensor is provided receiving light not passing through the vehicle rear window. At least the first light sensor is monitored for an extended period of time. At least one operating characteristic of the mirror system is established as a function of the monitoring.

Because the present invention provides a method of adapting an electro-optic rearview mirror system to a vehicle in which the rear window has an unknown level of transmissivity and provides an adaptive light-responsive vehicle control, such as for establishing a partial reflectance level of an electro-optic mirror, the invention is useful with vehicles which are built to various configurations without requiring changes in configuration of the control device. This allows one SKU to be provided where, instead, two or more SKUs were previously required. The commensurate saving in inventory levels and inventory tracking procedures results in a real cost savings in vehicle manufacturing.

These and other objects, advantages and features of this invention will become apparent upon review of the following specification in conjunction with the drawings.

DESCRIPTION OF THE PREFERRED EMBODIMENT

Figure 1:
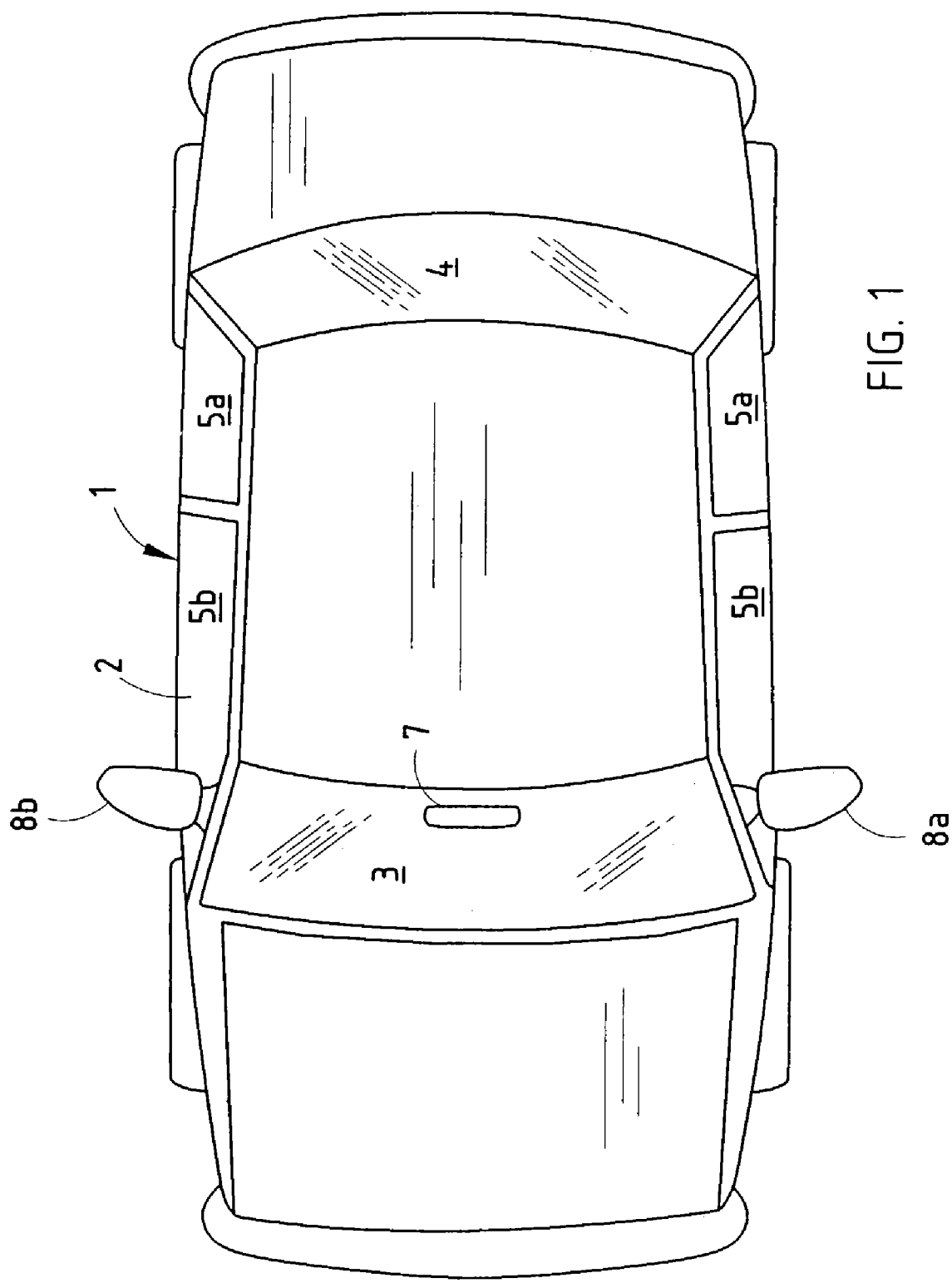
FIG. 1 is a top plan view of a vehicle incorporating a light-responsive vehicle control according to the invention.

Referring now specifically to the drawings, and the illustrative embodiments depicted therein, a vehicle 1, which is illustrated as an automobile, but also may be a sport utility vehicle, van, minivan, light truck, or the like, is illustrated having a passenger compartment 2 which is enclosed by a forward window, or windshield 3 for viewing forward of the vehicle, a rear window 4 for viewing rearward of the vehicle, passenger side windows 5a for viewing to the side by passengers riding in the backseat and driver side windows 5b for viewing to the side by the vehicle driver (FIG. 1). Rear window 4 and rear side windows 5a may be interchangeably selected by the purchaser to be either non-tinted windows or tinted windows. Tinted windows, have a lower light transmissivity than non-tinted windows because the tint attenuates light passing through the window. For safety reasons, windshield 3 and front side windows 5b are non-tinted.

Figure 2:
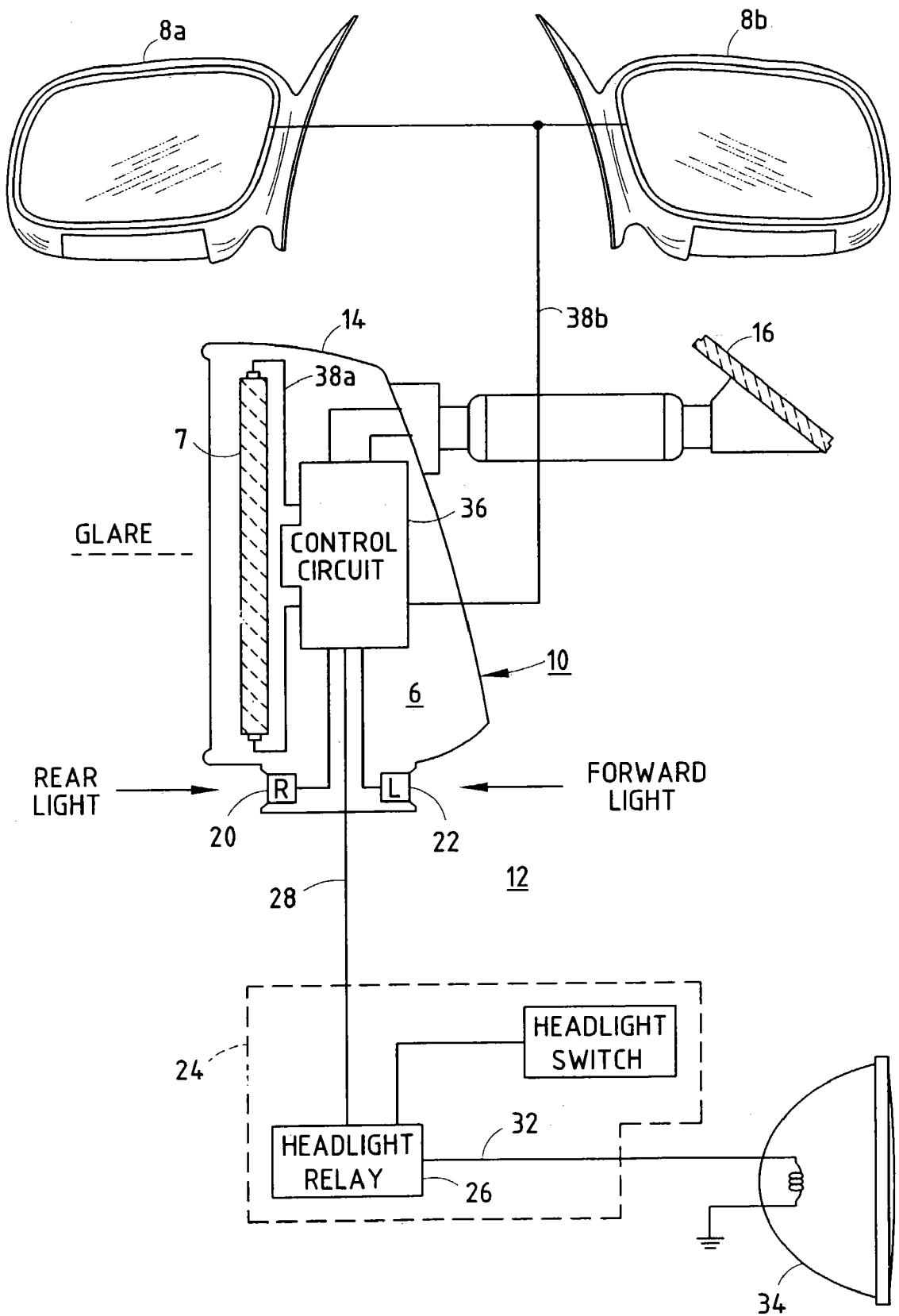
FIG. 2 is a block diagram illustrating application of a light-responsive vehicle control according to the invention to components of the vehicle.
Figure 3:
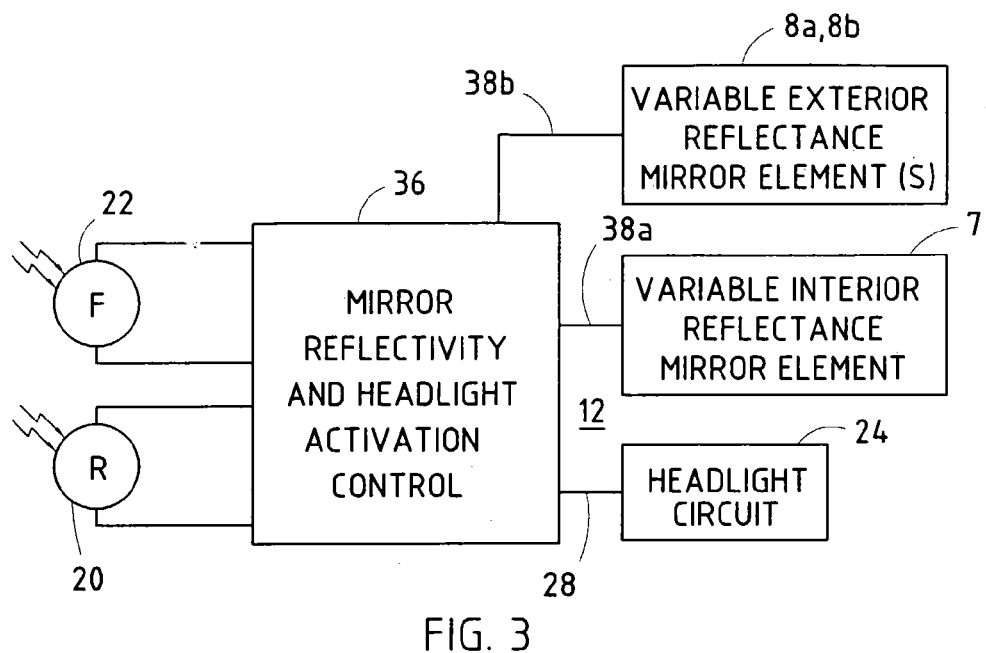
FIG. 3 is a block diagram of an electrical control for the system in FIG. 2.
Figure 4:
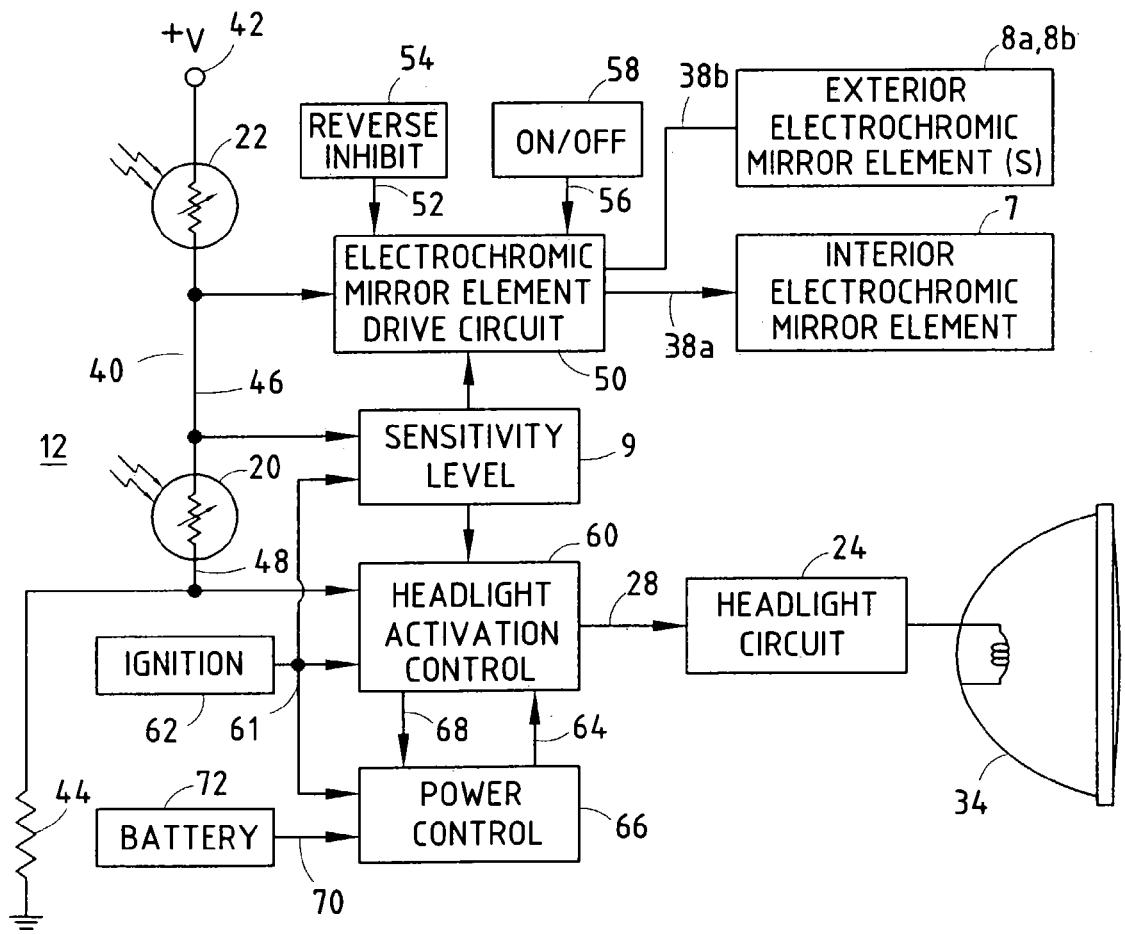
FIG. 4 is a combined schematic diagram and block diagram of an embodiment of the electrical control in FIG. 4.

Vehicle 1 also includes a light-responsive vehicle control, generally illustrated at 6 which is located, at least in part, within compartment 2 (FIGS. 2–4). In the illustrated embodiment, light-responsive vehicle control 6 is positioned within a housing 14 of an interior rearview mirror 10. However, light-responsive vehicle control 6 can be located in other portions of passenger compartment 2. In the illustrated embodiment, light-responsive vehicle control 6 is a combined automatic rearview mirror system and headlight activation control 12 which establishes a partial reflectance level of an electro-optic interior mirror element 7 and one or more exterior mirror elements 8a and 8b and determines the activation state of the headlights 34 of vehicle 1. In the preferred embodiment, mirror elements 7, 8a and 8b are electrochromic elements. Such electrochromic elements may be either of the electrochemichromic type, such as is disclosed in U.S. Pat. No. 5,140,455 issued to Varaprasad et al. and commonly assigned with the present application, the disclosure of which is hereby incorporated herein by reference, or may be of the solid-state type, such as is disclosed in U.S. Pat. No. 4,712,879 issued to Lynam et al., U.S. patent application Ser. No. 08/023,675, filed Feb. 26, 1993, by Varaprasad et al., abandoned on May 4, 1994, U.S. patent application Ser. No. 08/193,557 filed Feb. 8, 1994, by Varaprasad et al., abandoned on Mar. 21, 1995, U.S. patent application Ser. No. 08/238,521 filed Mar. 5, 1994, and U.S. Pat. Nos. 5,668,663 and 5,910,854 by Varaprasad et al., all commonly assigned with the present application, and as disclosed in U.S. Pat. No. 4,671,619 issued to Kamimori et al., the disclosures of which are hereby incorporated herein by reference. Such electrochromic mirror elements are continuously variable and exhibit multiple partial reflectance states as the voltage applied thereto is varied.

The details of automatic rearview mirror and headlight activation system 12 are disclosed in detail in commonly assigned U.S. Pat. No. 5,715,093 issued to Kenneth L. Schierbeek and Niall R. Lynam for an AUTOMATIC REARVIEW MIRROR SYSTEM WITH AUTOMATIC HEADLIGHT ACTIVATION, the disclosure of which is hereby incorporated herein by reference and will not be repeated herein. Suffice it to say, system 12 includes a mirror reflectivity and headlight activation control 36 which produces a coloration signal at 38a in order to color an interior electro-optic mirror element 7 to a partial reflectance level and a coloration signal 38b in order to color one or more exterior electro-optic mirror elements 8a, 8b to a partial reflectance level, which may or may not be different for each exterior mirror 8a, 8b and may or may not be different from the partial reflectance level of interior mirror element 7. Mirror reflectivity and headlight activation control 36 may additionally produces a signal on line 28 which is provided as an input to a headlight activation circuit 24. Headlight activation circuit 24, in turn, changes the activation state of headlights 34, such as between an OFF condition during high light levels and an ON condition during low light levels or between a daylight-running condition during high light levels and a nighttime operation condition during low light conditions. It should be understood that the light-responsive control could also be applied to an electro-optic rearview mirror system alone or to a headlight activation system alone. Also, the light-response control could be used to adjust the intensity of instrument lighting of the vehicle, namely to dim the instrument lighting during night driving conditions.

Light-responsive vehicle control 6 additionally includes at least one light sensor within passenger compartment 2. In the illustrated embodiment, light-responsive vehicle control 6 includes a light sensor 20, which faces rearward with respect to the direction of travel of vehicle 1, and a light sensor 22, which faces forward with respect to the direction of travel of vehicle 1. Light sensors 20, 22 provide inputs to mirror reflectivity and headlight activation control 36 in order to control the partial reflectance level of electro-optic mirror elements 7, 8a and 8b and the activation state of vehicle headlights 34. Light sensor 20 receives light originating outside the vehicle which passes through rear window 34. Light sensors 20, 22 may be photo-resistors, photo-diodes, photo-transistors or any other light-sensing device.

In the illustrated embodiment, forward-facing light sensor 22, rearward-facing light sensor 20, and a resistor 44 are connected in a voltage divider 40 in electrical series connection between a voltage source 42 and ground (FIG. 4). The signal on node 46 between forward light sensor 22 and rearward-facing light sensor 20 is supplied as an input to an electro-optic mirror element drive circuit 50 which supplies coloration signal 38a to interior electro-optic mirror element 7 and coloration signal 38b to each exterior electro-optic mirror element 8a, 8b. The signal on node 48 between rearward-facing light sensor 40 and resistor 44 is supplied as an input to a headlight activation control 60 which produces a signal at 28 as an input to headlight activation circuit 24. Mirror element drive circuit 50 may additionally receive an input 52 from a reverse inhibit switch 54 which forces electro-optic mirror elements 7, 8a and 8b to high reflectance levels when the vehicle is placed in reverse gear and an input 56 from an ON/OFF switch 58. Headlight activation control 60 may additionally receive an input 61 from the vehicle's ignition 22 and an input 64 from a power control 66 which responds to input 61 and input 70 from the vehicle's battery 72 in order to determine when the vehicle has been switched to an OFF condition. This allows the headlight activation control to delay deactivation of headlights 34. Headlight activation control 60 may additionally produce an input 68 to power control 66 in order to inform power control 66 of the activated state of the headlights upon powering down of vehicle 1.

Automatic rearview mirror and headlight activation system 10 additionally includes a control, or function, 9 which establishes one or more operating parameters of the drive circuit. In the illustrated embodiment, function 9 is a sensitivity level circuit which establishes a sensitivity level 51 for mirror element drive circuit 50 and a sensitivity level 59 for headlight activation control 60. Sensitivity level circuit 9 receives an input from node 48 and input 61 from vehicle ignition 61. These inputs provide sensitivity level circuit 9 to determine when light levels in the vicinity of the vehicle are indicative of daylight conditions, such as a light level above 1,000 lux, and when the vehicle's ignition is turned on. Mirror element drive circuit 50 responds to the signal level at node 46 as a function of the sensitivity level 51 established by sensitivity level circuit 9 in establishing the value of coloration signal 38b supplied to exterior mirror element 8a, 8b. For reasons that will be set forth below, the sensitivity level used by drive circuit 50 to establish the coloration signal 38a for interior mirror element 7 is fixed. Likewise, headlight activation control 60 responds to the signal at node 48 as a function of the sensitivity level 59 established by sensitivity level circuit 9 in determining whether to switch headlights 34 between an activated and a deactivated state. In general, for a given lighting condition sensed by light sensors 20, 22, mirror element drive circuit 50 will produce a coloration signal 38b which colors electro-optic mirror elements 8a, 8b to lower reflectivity levels in response to increases in sensitivity level 51 produced by sensitivity level 9 and vice versa. In general, headlight activation control 60 will produce an input 28 to headlight control 24 to switch headlights 24 to an activated, or a nighttime, condition for higher light levels sensed by sensors 20, 22 for increases in sensitivity level 59 produced by sensitivity level circuit 7, and vice versa.

Figure 5:
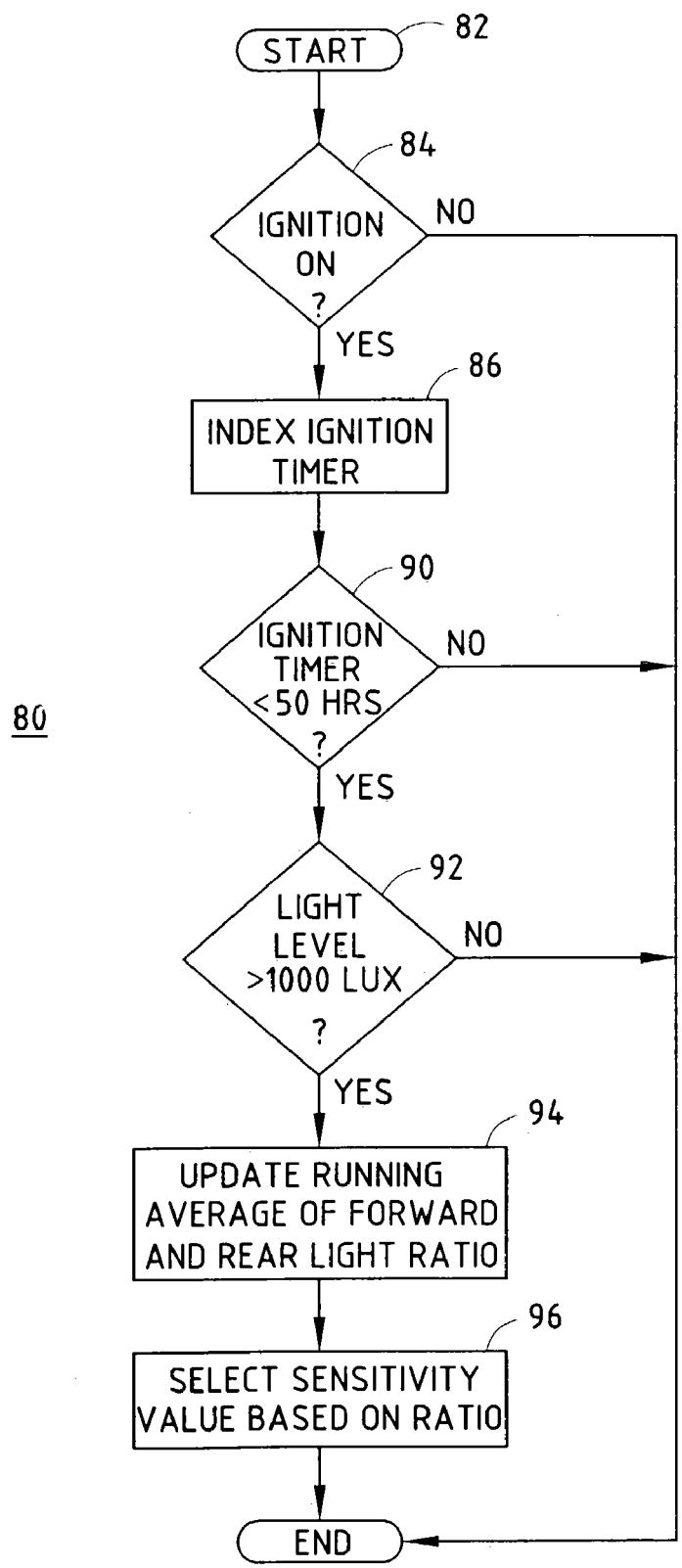
FIG. 5 is a flowchart of a method of adapting an electro-optic rearview mirror system to a vehicle according to the invention.

Control 12 performs a sensitivity select algorithm 80, illustrated in FIG. 5, at selected intervals, such as once every millisecond or other value, as would be understood by the skilled artisan. Algorithm 80 begins at 82 and determines at 84 whether the vehicle ignition 62 is on. If it is determined at 84 that the ignition is on, an ignition timer is indexed at 86. If it is determined at 84 that the ignition is not on, the program is exited at 88. After the ignition timer is indexed at 86, it is determined at 90 whether the ignition timer is less than 80 hours. If the ignition timer is greater than 80 hours, the program is exited at 88. The reason that the SENSITIVITY value is calculated only during the first number of hours of vehicle operation is that it is not expected that the configuration of the vehicle will change once the vehicle is placed in operation.

If it is determined at 90 that the ignition timer is less than 50 hours, it is then determined at 92 whether light levels are less than a particular level indicative of daylight conditions such as approximately 1,000 lux. The light level may be determined by the voltage level at node 48 which is representative of the lowest light level sensed by either forward light sensor 22 or rear light sensor 20. If it is determined at 92 that the sensed light level is not greater than approximately 1,000 lux, the program is exited at 88. If it is determined at 92 that the light level is greater than approximately 1,000 lux, control passes to 94 where a running average of the ratio of the forward to rear light levels is updated. By updating the running average only during daylight conditions, the control avoids errors which may be introduced by the amount of glare to which the vehicle is exposed at the time the SENSITIVITY value is determined. The forward to rear light level may be determined from the voltage at node 46. A register maintains a value which is updated by comparing the ratio sensed at 94 with the previous running average stored in that register in a manner which would be known to the skilled artisan. After the RATIO is updated at 94, the algorithm selects a sensitivity value at 96 based upon the RATIO value. In the illustrated embodiment, control is implemented by a digital logic system, preferably a microprocessor-based digital logic circuit and the value of the SENSITIVITY value is stored in electrically erasable programmable read-only memory (EEPROM). It should be understood that the sensitivity value, which is an operating parameter of control 12, may be an individual value such as will be useful with the control illustrated in FIG. 4. Alternatively, where other mirror element drive circuit configurations are used, the operating parameter may be an operating curve which is selected from a series of operating curves as would be appropriate for the particular embodiment of the mirror element drive circuit used.

The SENSITIVITY value selected and stored at 96 is used to establish the partial reflectance of exterior mirror elements 8a and 8b. The reason is that the sensitivity value as measured by algorithm 80 is a function of the average light levels sensed by forward and rearward light sensors 22, 20 which is affected by whether the rear window 4 is tinted or non-tinted. Control 12 does not utilize the algorithm 80 to select the SENSITIVITY value for establishing the partial reflectance level of interior electrochromic mirror element 7. The reason is that the glare viewed by the driver through interior electrochromic mirror element 7 passes through rear window 4. Therefore, the net effect is that making the rear window tinted is self-compensated for the interior rearview mirror as would be understood by the skilled artisan. In the illustrated embodiment, algorithm 80 additionally establishes a sensitivity level for headlight activation control 60. However, as previously set forth, algorithm 80 is useful to establish a sensitivity level for electro-optic rearview mirrors alone or headlight activation control alone. Also, the invention may be useful with other light-responsive control systems. In particular, for tinted rear windows, the SENSITIVITY value selected at 96 is increased such that the exterior mirrors darken quicker for increasing levels of glare sensed by mirror light sensor 20.

In operation, in a typical installation within a vehicle 2 having an interior mirror and one or more exterior mirrors 8a, 8b, a control having a forward-facing sensor 22 and a rearward-facing sensor 20 monitors light levels captured by the forward and rearward sensors. From the captured light levels, a determination is made of the tint and, optimally, the level of tint of the rear window. Whereby, for a given rear approaching glare intensity, the drive signal to the exterior mirror(s) is adapted to the tint of the rear window. Typically, the exterior mirror(s) will be driven with a higher coloration signal than that provided to the interior mirror, such that the exterior mirror(s) is driven to a partial reflectance level that is lower than the partial reflectance level of the interior mirror. In particular, when installed in a vehicle having a tinted rear window, the reflectance of the exterior mirror(s) is up to approximately 10% lower than the reflectance of the interior mirror and preferably more than approximately 1.0% but less than approximately 5% lower than the reflectance level of the interior mirror.

Figure 6:
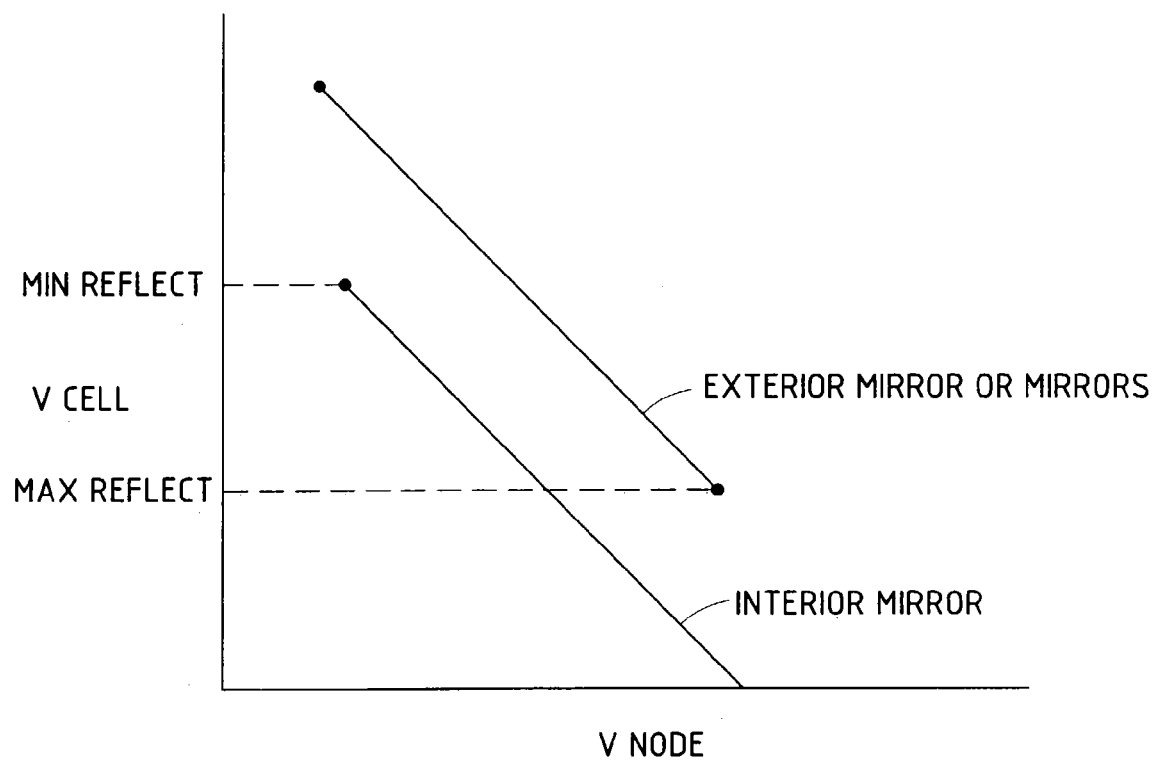
FIG. 6 is a graph illustrating interior mirror and exterior mirror drive signal voltages ($V_{cell}$) versus the voltage on the node between the forward-facing light sensor and the rearward-facing light sensor ($V_{node}$) which varies with glare.

Another operating parameter that control 12 may establish is a value of ratio of the reflectance level of one or both exterior mirror elements 8a, 8b to the reflectance level of interior mirror element 7. In particular, the ratio could establish the partial reflectance level of the exterior mirror at a percentage of the reflectance level of the interior mirror. The percentage could be fixed or could vary with another parameter, such as sensed light levels. As illustrated in FIG. 6, the operating parameter that control 12 may establish may further include a minimum value of reflectance of interior mirror element 7 (MINREFLECT). The minimum value MINREFLECT is a value of reflectance below which the interior mirror would not be colored to. Once the control 12 begins to lower the reflectivity of the mirror elements 7, 8a, 8b, for example, in the presence of glare, the reflectance of the interior and exterior mirror elements would decrease either in unison or at a fixed or variable ratio. Once the reduction in reflectance of the interior mirror reaches MINREFLECT, the reflectance of the interior mirror does not decrease further even though the reflectance level of the exterior mirrors may continue to be reduced. The level of MINREFLECT may be selected by control 12 as a function of the tint level of the vehicle rear window 4. By way of example, in the situation where rear window 4 is not tinted, the interior mirror element 7 and exterior mirror elements 8a, 8b may reduce in reflectance level, in response to a strong glare source, until the reflectance level of all mirror elements is approximately 8%. In contrast, in the situation where rear window 4 is tinted at an approximate 3-to-1 ratio with respect to the side windows, the interior mirror element 7 may reduce to a reflectance level of approximately 24% in response to a strong glare source while the exterior mirror elements 8a, 8b may reduce to a reflectance level of approximately 8%. The goal is to achieve the same level of glare source brightness perceived by the driver in all of the mirrors whether the vehicle is equipped with a tinted rear window or a non-tinted rear window. This is accomplished by establishing a minimum value of reflectivity below which the interior mirror does not color that is approximately the same ratio to the minimum reflectivity of the exterior mirrors that the ratio of rear window transmissivity is to that of the driver side windows. Therefore, if, for example, the ratio of rear window transmissivity is 25% of the transmissivity of the driver side windows and the minimum reflectivity of the exterior mirrors is 8%, the value of MINREFLECT for the interior mirror would be approximately 32%.

In a similar manner, control 12 may establish a maximum reflectivity value of the exterior mirrors (MAXREFLECT) which represents a reflectivity value above which the exterior mirrors are not allowed to bleach (FIG. 6). The value of MAXREFLECT may be related to the maximum reflectivity value that the interior mirror can achieve as the proportion of rear window transmissivity to driver side window transitivity. Thus, if the window transmissivity ratio is 3-to-1, and the maximum reflectivity value the interior mirror can achieve is 92%, then the value of MINREFLECT may be approximately 76% (100% minus 3 times (100% minus 92%)).

Although the operating parameter of the mirror system, namely sensitivity or relative ratio of front-to-rear light levels, or MINREFLECT is illustrated as being derived from long duration sampling of light sensed through the rear window, other techniques may be used for selecting the operating parameter based upon the degree of rear window tint. For example, the mirror system control may include a manually adjustable switch behind an opening in the mirror case, or a switch operation sequence of switches having other functions, to select an operating parameter. Either way, it is desirable that a manual switch actuation be provided that is accessible to manufacturing personnel or dealership technicians but which would not be inadvertently actuated by the driver. This accommodates manual intervention to adjust the operating parameter. This would be especially useful, for example, upon replacement of a broken rear window should a window of different tint be installed. The manual switch actuation could be used to enable or disable a particular operating parameter selected by the control in response to long duration sampling of light levels. Alternatively, the manual switch actuation would be used to step through a number of stored parameter values to suit various window transmissions.

The invention is capable of being embodied in either an analog or a digital control.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A vehicular electro-optic rearview mirror system, comprising:
   a vehicle including a passenger compartment;
   an interior rearview mirror assembly in said passenger compartment; said interior rearview mirror assembly having an interior electro-optic mirror reflective element;
   at least one exterior rearview mirror assembly outside of said passenger compartment;
   said exterior rearview mirror assembly having an exterior electro-optic mirror reflective element;
   an ambient detecting light sensor in said passenger compartment;
   a glare detecting light sensor in said passenger compartment;
   a control receiving an input from said ambient and glare detecting light sensors, said control generating an interior mirror reflectance level signal that establishes a reflectance level of said interior mirror reflective element, said control further generating an exterior mirror reflectance level signal that establishes a reflectance level of said exterior mirror reflective element; and
   said control including a sensitivity selection for establishing a sensitivity level as a function of light sensed by at least one of said ambient and glare detecting light sensors, wherein at least one of said interior mirror reflectance level signal and said exterior mirror reflectance level signal being at least a function of the sensitivity level established by said sensitivity selection.

2. The mirror system in claim 1 wherein the reflectance level of said exterior mirror reflective element is generally more dimmed for higher levels of said sensitivity level.

3. The mirror system in claim 1 wherein said vehicle includes vehicle headlights operable in a plurality of activation states and wherein said control further producing a headlight activation signal that establishes an activation state of said headlights.

4. The mirror system in claim 3 wherein said headlight activation signal is a function of light sensed by at least one of said ambient and glare detecting light sensors and the sensitivity level determined by said sensitivity selection.

5. The mirror system in claim 1 wherein said sensitivity level is established as a function of a sampling of light sensed by said at least one of said ambient and glare detecting light sensors.

6. The mirror system in claim 5 wherein said sensitivity level is established in response to long duration sampling of said at least one of said ambient and glare detecting light sensors.

7. The mirror system in claim 6 wherein said long duration sampling is on an order of at least one hour of vehicle operation.

8. The mirror system in claim 6 wherein said long duration sampling is on an order of at least ten hours of vehicle operation.

9. The mirror system in claim 6 wherein said long duration sampling occurs when light sensed by said at least one of said ambient and glare detecting light sensors is greater than a particular light level indicative of daylight operating conditions.

10. The mirror system in claim 9 wherein said particular light level is on an order of 1,000 lux.

11. The mirror system in claim 6 wherein said long duration sampling occurs when the vehicle is initially operated.

12. The mirror system in claim 1 wherein said interior electro-optic mirror reflective element comprises an electrochromic mirror reflective element.

13. The mirror system in claim 1 wherein said exterior electro-optic mirror reflective element comprises an electrochromic mirror reflective element.

14. A vehicular electro-optic rearview mirror system, comprising:
   a vehicle including a passenger compartment having at least a forward-viewing forward window, a side-viewing window having a side window light transmission value and a rearward-viewing rear window having a rear window light transmission value;
   an interior rearview mirror assembly having an interior electro-optic mirror reflective element;
   said interior reflective element intercepting passed light that passes through said rearward-viewing rear window, said light passing through said rearward-viewing rear window being attenuated as a function of said rear window light transmission value, said interior reflective element reflecting at least a portion of said passed light directly to a driver;

at least one exterior rearview mirror assembly outside of said passenger compartment;

said exterior rearview mirror assembly having an exterior electro-optic mirror reflective element;

said exterior reflective element reflecting at least a portion of light incident thereon to the driver via transmission through said side-viewing window;

at least one light sensor in said passenger compartment and directed toward said rearward-viewing rear window to receive said light passing through said rearward-viewing rear window;

a control receiving an input from said at least one light sensor and generating an interior mirror reflectance level signal that establishes a reflectance level of said interior mirror reflective element, said control further generating an exterior mirror reflectance level signal that establishes a reflectance level of said exterior mirror reflective element;

said control including a sensitivity selection for establishing a sensitivity level as a function of light sensed by said at least one light sensor, wherein at least one of said interior mirror reflectance level signal and said exterior mirror reflectance level signal being at least a function of the sensitivity level established by said sensitivity selection.

15. The mirror system in claim 14 wherein the reflectance level of said exterior mirror reflective element is generally more dimmed for higher levels of said sensitivity level.

16. The mirror system in claim 14 wherein said vehicle includes vehicle headlights operable in a plurality of activation states and wherein said control further producing a headlight activation signal that establishes an activation state of said headlights.

17. The mirror system in claim 16 wherein said headlight activation signal is a function of light sensed by said at least one light sensor and the sensitivity level determined by said sensitivity selection.

18. The mirror system in claim 14 wherein said sensitivity level is established as a function of a sampling of light sensed by said at least one light sensor.

19. The mirror system in claim 18 wherein said sensitivity level is established in response to long duration sampling of said at least one of said forward and rearward light sensors.

20. The mirror system in claim 19 wherein said long duration sampling is on an order of at least one hour of vehicle operation.

21. The mirror system in claim 19 wherein said long duration sampling is on an order of at least ten hours of vehicle operation.

22. The mirror system in claim 19 wherein said long duration sampling occurs when light sensed by said at least one light sensor is greater than a particular light level indicative of daylight operating conditions.

23. The mirror system in claim 22 wherein said particular light level is on an order of 1,000 lux.

24. The mirror system in claim 19 wherein said long duration sampling occurs when the vehicle is initially operated.

25. The mirror system in claim 14 wherein said interior electro-optic mirror reflective element comprises an electrochromic mirror reflective element.

26. The mirror system in claim 14 wherein said exterior electro-optic mirror reflective element comprises an electrochromic mirror reflective element.

27. An adaptive vehicle automatic rearview mirror system, comprising:

a vehicle including a passenger compartment having at least a forward-viewing forward window, a side-viewing window having a side window light transmission value and a rearward-viewing window having a rear window light transmission value, an interior rearview mirror assembly and at least one exterior rearview mirror assembly;

said interior rearview mirror assembly including an interior electro-optic mirror reflective element in said passenger compartment;

said at least one exterior rearview mirror assembly including an exterior electro-optic mirror reflective element outside of said passenger compartment;

at least two light sensors within the passenger compartment, at least one of said at least two light sensors facing generally rearwardly of the vehicle to receive light passing through the rear window of the vehicle; and a control receiving an input from said at least two light sensors and generating an interior mirror reflectance signal establishing a reflectance level of said interior electro-optic mirror reflective element, said control further generating an exterior mirror reflectance signal establishing a reflectance level of said exterior electro-optic mirror reflective element;

said control including a sensitivity selection for establishing a sensitivity level as a function of a sampling of light sensed by said at least two light sensors, wherein at least one of said interior mirror reflectance level signal and said exterior mirror reflectance level signal being at least a function of the sensitivity level established by said sensitivity selection; and wherein said sensitivity selection establishes said sensitivity level in response to long duration sampling of said at least two light sensors.

28. The mirror system in claim 27 wherein the reflectance level of said exterior mirror reflective element is generally more dimmed for higher levels of said sensitivity level.

29. The mirror system in claim 27 wherein said vehicle includes headlights operable in a plurality of activation states and wherein said control establishes an activation state of said headlights.

30. The mirror system in claim 29 wherein said headlight activation signal is a function of light sensed by said at least two light sensors and the sensitivity level determined by said sensitivity selection.

31. The mirror system in claim 27 wherein said long duration sampling is on an order of at least one hour of vehicle operation.

32. The mirror system in claim 27 wherein said long duration sampling is on an order of at least ten hours of vehicle operation.

33. The mirror system in claim 27 wherein said long duration sampling occurs when light sensed by said at least one of said forward and rearward light sensors is greater than a particular light level indicative of daylight operating conditions.

34. The mirror system in claim 33 wherein said particular light level is on an order of 1,000 lux.

35. The mirror system in claim 27 wherein said long duration sampling occurs when the vehicle is initially operated.

36. The mirror system in claim 27 wherein said interior electro-optic mirror reflective element comprises an electrochromic mirror reflective element.

37. The mirror system in claim 27 wherein said exterior electro-optic mirror reflective element comprises an electrochromic mirror reflective element.

* * * * *

UNITED STATES PATENT AND TRADEMARK OFFICE
CERTIFICATE OF CORRECTION

PATENT NO.          : 7,064,310 B2
APPLICATION NO. : 10/614234
DATED                  : June 20, 2006
INVENTOR(S)        : Kenneth Schofield and Kenneth L. Schierbeek It is certified that error appears in the above-identified patent and that said Letters Patent is hereby corrected as shown below:

Column 1:
Line 10, Insert --pending-- before "prior".

Column 2:
Line 29, "transitivity" should be --transmissivity--.

Column 9:
Line 11, "transitivity" should be --transmissivity--.
Line 14, "MINREFLECT" should be --MAXREFLECT--.

Signed and Sealed this

Fourteenth Day of October, 2008

JON W. DUDAS
*Director of the United States Patent and Trademark Office*